(12) United States Patent
von Gynz-Rekowski et al.

(10) Patent No.: US 10,041,299 B2
(45) Date of Patent: Aug. 7, 2018

(54) CV JOINT FOR DRILLING MOTOR AND METHOD

(71) Applicant: ASHMIN HOLDING LLC, Conroe, TX (US)

(72) Inventors: Gunther H H von Gynz-Rekowski, Montgomery, TX (US); William C. Herben, Magnolia, TX (US)

(73) Assignee: Ashmin Holding LLC, Conroe, TX (US)

( * ) Notice: Subject to any disclaimer, the term of this patent is extended or adjusted under 35 U.S.C. 154(b) by 587 days.

(21) Appl. No.: 14/702,324

(22) Filed: May 1, 2015

(65) Prior Publication Data

US 2016/0319883 A1  Nov. 3, 2016

(51) Int. Cl.
*E21B 4/00* (2006.01)
*E21B 17/03* (2006.01)
*F16D 3/221* (2006.01)

(52) U.S. Cl.
CPC ............... *E21B 4/00* (2013.01); *E21B 17/03* (2013.01); *F16D 3/221* (2013.01)

(58) Field of Classification Search
CPC .................................... E21B 4/00; E21B 17/03
See application file for complete search history.

(56) References Cited

U.S. PATENT DOCUMENTS

| | | | |
|---|---|---|---|
| 4,772,246 A | 9/1988 | Wenzel | |
| 5,007,490 A | 4/1991 | Ide | |
| 5,267,905 A | 12/1993 | Wenzel et al. | |
| 5,520,256 A | 5/1996 | Eddison | |
| 5,651,737 A | 7/1997 | Le Blanc | |
| 6,319,132 B1* | 11/2001 | Krisher | B60K 17/22 277/423 |
| 6,375,895 B1 | 4/2002 | Daemen | |
| 6,569,020 B1 | 5/2003 | Falgout, Sr. | |
| 6,733,393 B2 | 5/2004 | Rivin | |
| 6,949,025 B1 | 9/2005 | Kraus et al. | |
| 7,004,843 B1 | 2/2006 | Kerstetter | |
| 8,033,920 B1 | 10/2011 | Benson | |
| 2005/0272507 A1 | 12/2005 | Wenzel et al. | |

(Continued)

OTHER PUBLICATIONS

International Search Report and Written Opinion of the International Searching Authority dated Aug. 11, 2016 in Applicant counterpart International Application No. PCT/US16/27400.

*Primary Examiner* — Matthew R Buck
*Assistant Examiner* — Aaron L Lembo
(74) *Attorney, Agent, or Firm* — Jones Walker LLP

(57) ABSTRACT

A CV joint for a downhole drilling motor includes a center shaft including a top shaft section and a bottom shaft section. The top shaft section is at least partially housed within a cavity of a first insert, which is housed within a cavity of a rotor adapter. The bottom shaft section is at least partially housed within a cavity of a second insert, which is housed within a cavity of a drive shaft adapter. An outer surface of the top and bottom shaft sections may include multiple top shaft pockets and multiple bottom shaft pockets, respectively. The first and second inserts may each include a series of recesses. Top shear members may be partially housed within the top shaft pockets and the recesses of the first insert. Bottom shear members may be partially housed within the bottom shaft pockets and the recesses of the second insert.

23 Claims, 6 Drawing Sheets

(56) References Cited

U.S. PATENT DOCUMENTS

2010/0044113 A1    2/2010   Leblanc et al.
2010/0313692 A1   12/2010   Wenzel
2014/0124268 A1    5/2014   Breaux

* cited by examiner

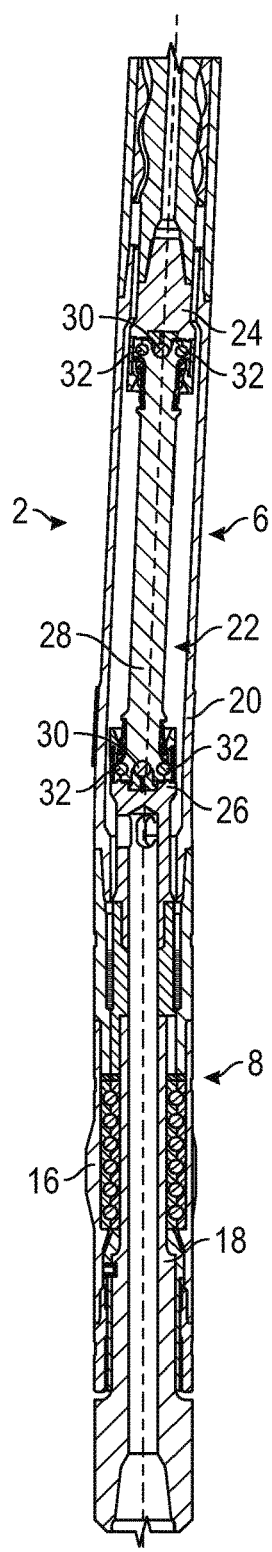
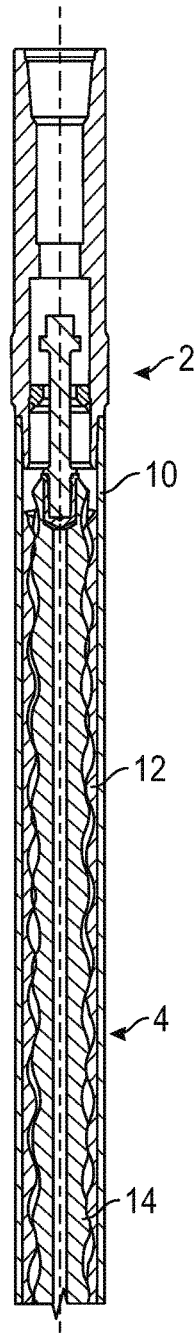
FIG. 1A
(Prior Art)
FIG. 1B
(Prior Art)

CV JOINT FOR DRILLING MOTOR AND METHOD

BACKGROUND OF THE INVENTION

In the drilling of oil and gas wells, downhole drilling motors may be connected to a drill string to rotate and steer a drill bit. Conventional drilling motors typically include a power assembly, a transmission assembly, and a bearing assembly. Rotation is provided by the power assembly that may be a positive displacement motor driven by drilling fluid (mud) circulation. The transmission assembly transmits torque and speed from the power assembly to a drill bit disposed at a lower end of the drilling motor. The bearing assembly takes up the axial and radial loads imparted on the drill string during drilling.

For example, conventional drilling motor 2 shown in FIGS. 1A and 1B includes power assembly 4, transmission assembly 6, and bearing assembly 8. Power assembly 4 may include stator housing 10, stator 12 secured within stator housing 10, and rotor 14 rotatable within stator 12. Stator 12 may have a helically-contoured inner surface. Rotor 14 may have a helically-contoured outer surface. Together, they define a positive displacement fluid motor having a helically-shaped progressive cavity. Bearing assembly 8 may include bearing housing 16 and rotatable drive shaft 18 secured within bearing housing 16. Transmission assembly 6 may include transmission housing 20 and transmission shaft assembly 22 for connecting rotor 14 to drive shaft 18.

Drilling fluid or mud is pumped from the well surface through the drill string or drill pipe to drilling motor 2. The drilling fluid or mud flows through the cavity formed between rotor 14 and stator 12, through transmission housing 20 around transmission shaft assembly 22, into the inlet ports provided on drive shaft 18 or a portion of transmission shaft assembly 22, through drive shaft 18, and out through the outlet port to flush cuttings from the wellbore and cool the drill bit. The drilling fluid drives rotor 14 to rotate within stator 12, with rotor 14 orbiting around the inner surface of stator 12. Transmission shaft assembly 22 transmits the rotational movements of rotor 14 to drive shaft 18. Drive shaft 18 rotates concentrically within bearing housing 16 to drive the drill bit.

Transmission shaft assembly 22 may be formed of a constant-velocity joint ("CV joint"). The CV joint may include rotor adapter 24 coupled to rotor 14, drive shaft adapter 26 coupled to drive shaft 18, and center shaft 28 coupling rotor adapter 24 to drive shaft adapter 26. The CV joint may further include thrust members 30 and shear members 32 at the upper and lower ends of center shaft 28. Shear members 32 may contact an outer surface of center shaft 28 and an inner surface of rotor adapter 24 and drive shaft adapter 26. Through continuous contact, shear members 32 cause wear on the inner surface of rotor adapter 24 and drive shaft adapter 26, which may lead to failure of rotor adapter 24 and drive shaft adapter 26.

BRIEF DESCRIPTION OF THE DRAWINGS

FIGS. 1A and 1B are sequential cross-sectional views of a prior art drilling motor including a CV joint.

DETAILED DESCRIPTION OF THE PREFERRED EMBODIMENTS

Figure 2:
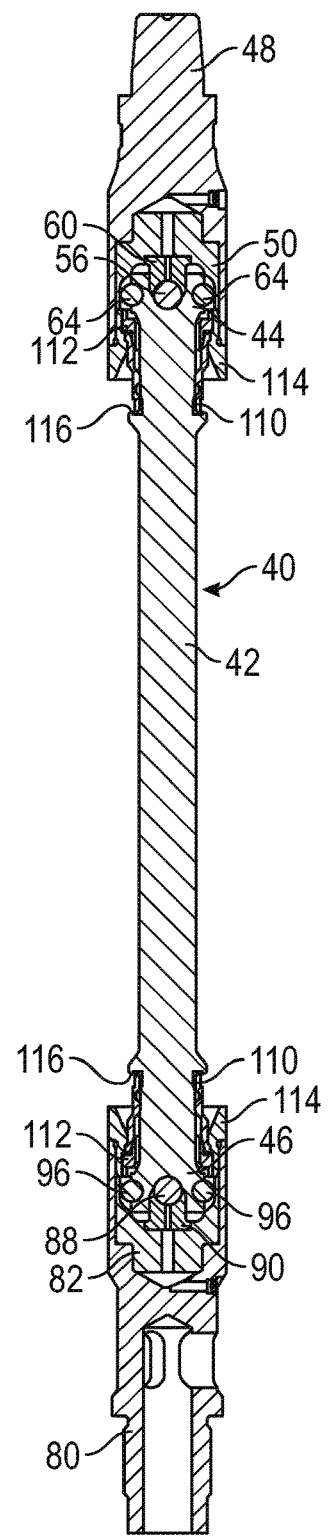
FIG. 2 is a cross-sectional view of a CV joint for a downhole drilling motor disclosed herein.
Figure 3:
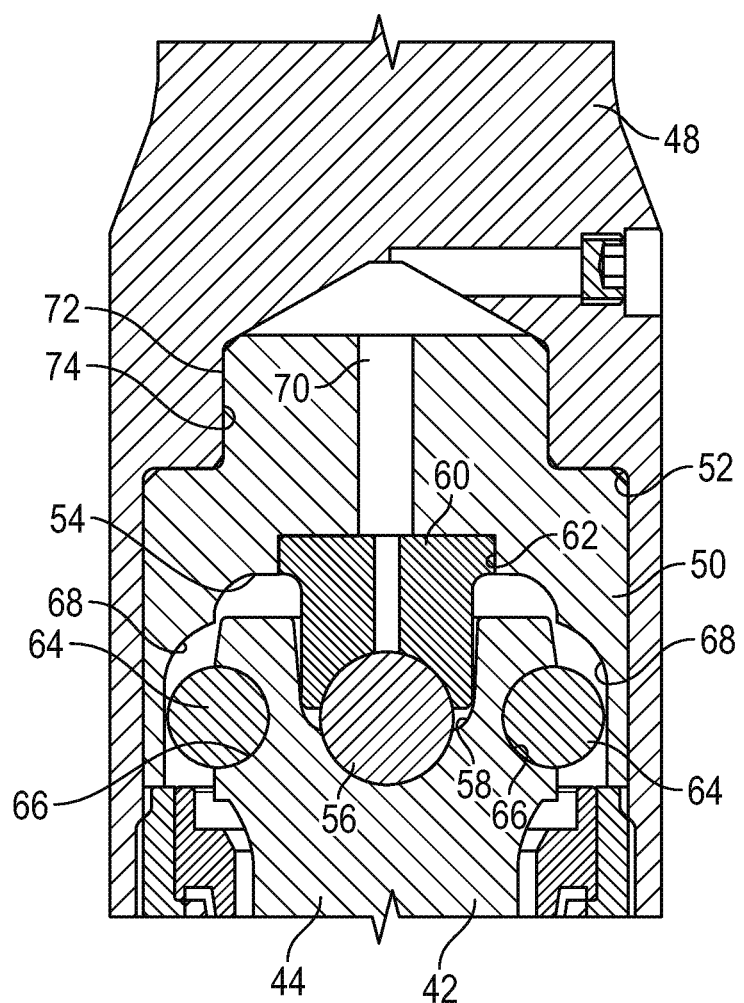
FIG. 3 is a partial cross-sectional view showing a first insert within the CV joint.

FIGS. 2 and 3 illustrate CV joint 40 for drilling motors. CV joint 40 may include center shaft 42 including top shaft section 44 and bottom shaft section 46. CV joint 40 may also include rotor adapter 48 and first insert 50 housed within cavity 52 of rotor adapter 48. Top shaft section 44 may be at least partially housed within cavity 54 of first insert 50.

Top thrust member 56 may be disposed within central cavity 58 of top shaft section 44. Top thrust member 56 may be formed of a ball-shaped component. Alternatively, top thrust member 56 may be integrally formed with central cavity 58 of top shaft section 44. Top thrust pin 60 may be partially disposed within central cavity 58. Top thrust pin 60 may also engage top thrust member 56 and first insert 50. For example, top thrust pin 60 may be partially disposed within central recess 62 of first insert 50. Top thrust pin 60 may communicate an axial load of a rotor disposed above from first insert 50 to center shaft 42. Top thrust pin 60 may also provide an appropriate vertical spacing between center shaft 42 and first insert 50.

A series of top shear members 64 may be partially disposed within and in contact with a series of pockets 66 on the outer surface of top shaft section 44. Top shear members 64 may also be partially disposed within and in contact with a series of recesses 68 on a surface of cavity 54 of first insert 50. Top shear members 64 may transmit torque and speed from first insert 50 to center shaft 42 through contact with pockets 66 of center shaft 42 and recesses 68 of first insert 50. Top shear members 64 may be formed of ball-shaped components, cylindrical components, convex barrel-shaped components, or any other rounded components.

Figure 4:
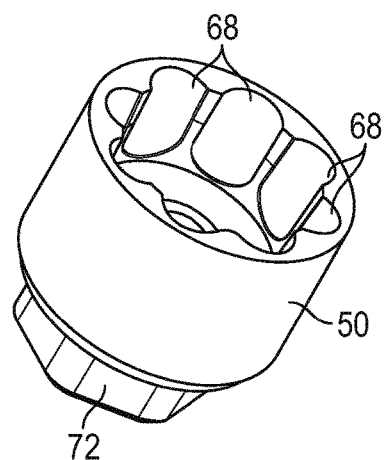
FIG. 4 is a perspective view of the insert.
Figure 5:
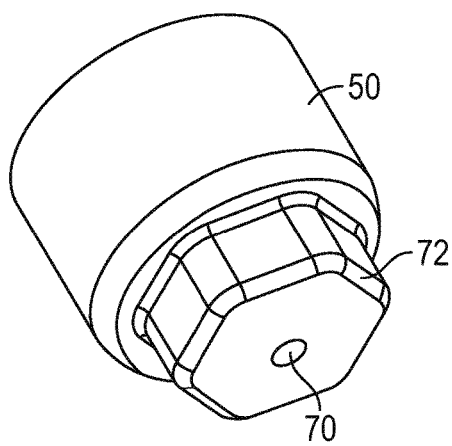
FIG. 5 is another perspective view of the insert.
Figure 6:
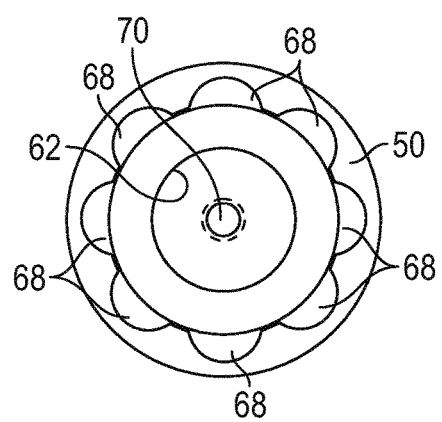
FIG. 6 is an end view of the insert.

FIGS. 4-6 illustrate first insert 50 with recesses 68, central recess 62, and central bore 70. First insert 50 may further include outer profile 72. Outer profile 72 may be formed on a reduced diameter section of first insert 50 as shown. In other embodiments, outer profile 72 may be formed on an outer surface of the larger diameter section of first insert 50. Outer profile 72 may engage inner profile 74 of cavity 52 of rotor adapter 48 (shown in FIG. 3). Through the engagement of outer profile 72 and inner profile 74, CV joint 40 may transmit torque and speed from rotor adapter 48 to first insert 50. Inner profile 74 may have a shape that is reciprocal to the shape of outer profile 72. For example, outer profile 72 may be a hexagonally-shaped projection on first insert 50 (as shown) and inner profile 74 may be a hexagonally-shaped recess within cavity 52 of rotor adapter 48. Alternatively, outer and inner profiles 72 and 74 may be formed of splines or flat components. Outer profile 72 and inner profile 74 may be formed of any shapes capable of cooperating to transmit torque and speed from rotor adapter 48 to first insert 50.

Figure 7:
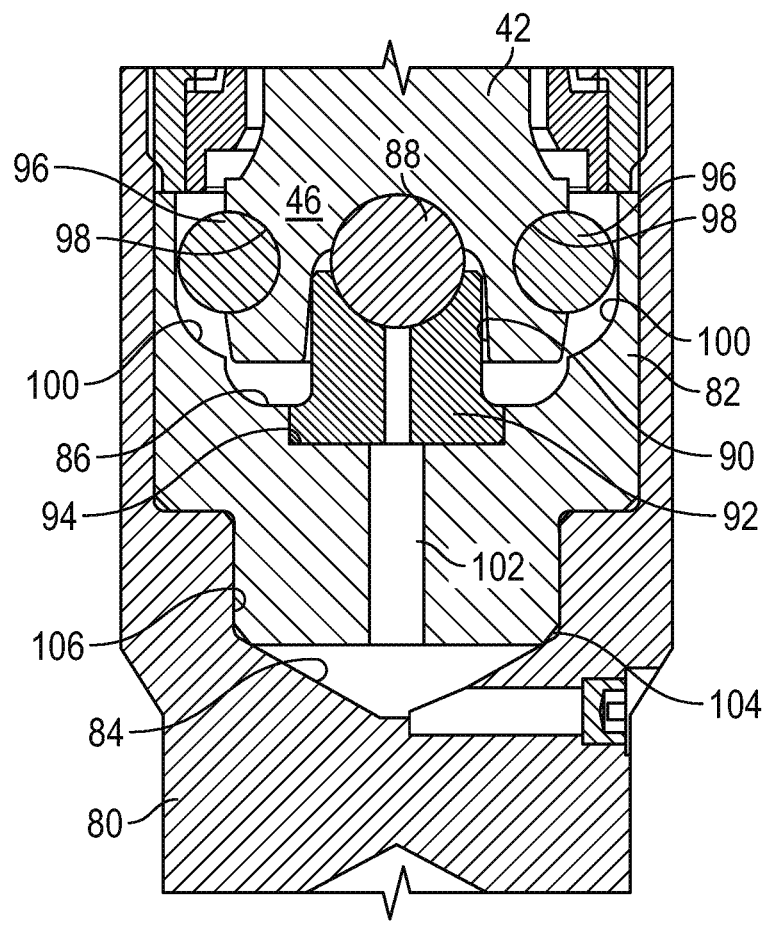
FIG. 7 is a partial cross-sectional view showing a second insert within the CV joint.

With reference now to FIGS. 2 and 7, CV joint 40 may further include drive shaft adapter 80 and second insert 82 housed within cavity 84 of drive shaft adapter 80. Bottom shaft section 46 may be at least partially housed within cavity 86 of second insert 82. In one embodiment, drive shaft adapter 80 may be identical to rotor adapter 48. Bottom thrust member 88 may be disposed within central cavity 90 of bottom shaft section 46. Bottom thrust member 88 may be formed of a ball-shaped component. Alternatively, bottom thrust member 88 may be integrally formed with central cavity 90 of bottom shaft section 46. Bottom thrust pin 92 may be partially disposed within central cavity 90 such that it engages bottom thrust member 88. Bottom thrust pin 92 may also engage second insert 82. For example, bottom thrust pin 92 may be partially disposed within central recess 94 of second insert 82. Bottom thrust pin 92 may communicate an axial load of a rotor disposed above from center shaft 42 to second insert 82. Bottom thrust pin 92 may also provide an appropriate vertical spacing between center shaft 42 and second insert 82.

A series of bottom shear members 96 may be partially disposed within and in contact with a series of pockets 98 on the outer surface of bottom shaft section 46. Bottom shear members 96 may also be partially disposed within and in contact with a series of recesses 100 on a surface of cavity 86 of second insert 82.

Second insert 82 may be identical to first insert 50 shown in FIGS. 4-6. Specifically, second insert 82 may include central bore 102 and outer profile 104. Outer profile 104 of second insert 82 may be on a reduced diameter section of second insert 82 or on an outer surface of the larger diameter section of second insert 82. Outer profile 104 may engage inner profile 106 of cavity 84 of drive shaft adapter 80. Through the engagement of outer profile 104 and inner profile 106, CV joint 40 may transmit torque and speed from second insert 82 to drive shaft adapter 80. Inner profile 106 may have a shape that is reciprocal to the shape of outer profile 104. For example, outer profile 104 may be a hexagonally-shaped projection on second insert 82 and inner profile 106 may be a hexagonally-shaped recess within cavity 84 of drive shaft adapter 80. Alternatively, outer and inner profiles 104 and 106 may be formed of splines or flat components. Outer profile 104 and inner profile 106 may be formed of any shapes capable of cooperating to transmit torque and speed from second insert 82 to drive shaft adapter 80.

In an alternate embodiment, inserts 50 and 82 and adapters 48 and 80 may include no cooperating inner and outer profiles. In this embodiment, inserts 50 and 82 may each be pinned or bolted to adapters 48 and 80, respectively, in order to transmit torque and speed between inserts 50 and 82 and adapters 48 and 80.

CV joint 40 may further include components for retaining top shaft section 44 within first insert 50 and rotor adapter 48 and for retaining bottom shaft section 46 within second insert 50 and drive shaft adapter 80. For example, FIG. 1 illustrates boots 110, shell members 112, and nuts 114 disposed around center shaft 42 near top shaft section 44 and bottom shaft section 46. Boots 110 may each engage shoulder 116 of center shaft 42 on one end and shell member 112 on the other end. Shell members 112 may engage shaft sections 44 and 46 and inserts 50 and 82, respectively. Nuts 114 may threadedly engage adapters 48 and 80, while retaining boots 110 and shell members 112. In this way, CV joint 40 may maintain the connection between rotor adapter 48 and center shaft 42 and the connection between center shaft 42 and drive shaft adapter 80.

First and second inserts 50 and 82 may be formed of the same material as rotor adapter 48 and drive shaft adapter 80. Alternatively, inserts 50 and 82 may be formed of a different material than that of adapters 48 and 80. Inserts 50 and 82 may be formed of a material having a greater hardness value than that of a material of adapters 48 and 80. For example, the hardness value of the material of inserts 50 and 82 may be a Brinell hardness of 500 BHN or greater. In either embodiment, if inserts 50 and 82 fail due to wear on recesses 68 and 100, inserts 50 and 82 may be replaced without replacing adapters 48 and 80.

First and second inserts 50 and 82 may be formed of an abrasive wear resistant material to lengthen the life of inserts 50 and 82. For example, inserts 50 and 82 may be formed of a ceramic material, tungsten carbide, chromium carbide, titanium carbide, or tool steel. In one embodiment, a portion of inserts 50 and 82 are formed of wear resistant material such that inner surfaces of recesses 68 and 100 are formed of the wear resistant material. Alternatively, inserts 50 and 82 may include an abrasive wear resistant surface, which may be applied by a surface treatment or by coating inserts 50 and 82 with an abrasive wear resistant material (e.g., the materials listed above).

While adapters of conventional CV joints, such as rotor adapter 24 and drive shaft adapter 26 shown in FIGS. 1A and 1B, include recesses for shear members, the conventional adapters may not be formed of similar wear resistant materials due to the brittleness of these materials. Specifically, adapters require threads to connect to the rotor and the drive shaft of the drilling motor, but the wear resistant materials may break during formation of threads.

Recesses 68 and 100 have increased strength and decreased wear relative to recesses in conventional CV joints. Accordingly, CV joint 40 may have a longer life than conventional CV joints. CV joint may also transmit a higher torque and speed than conventional CV joints.

Figure 8:
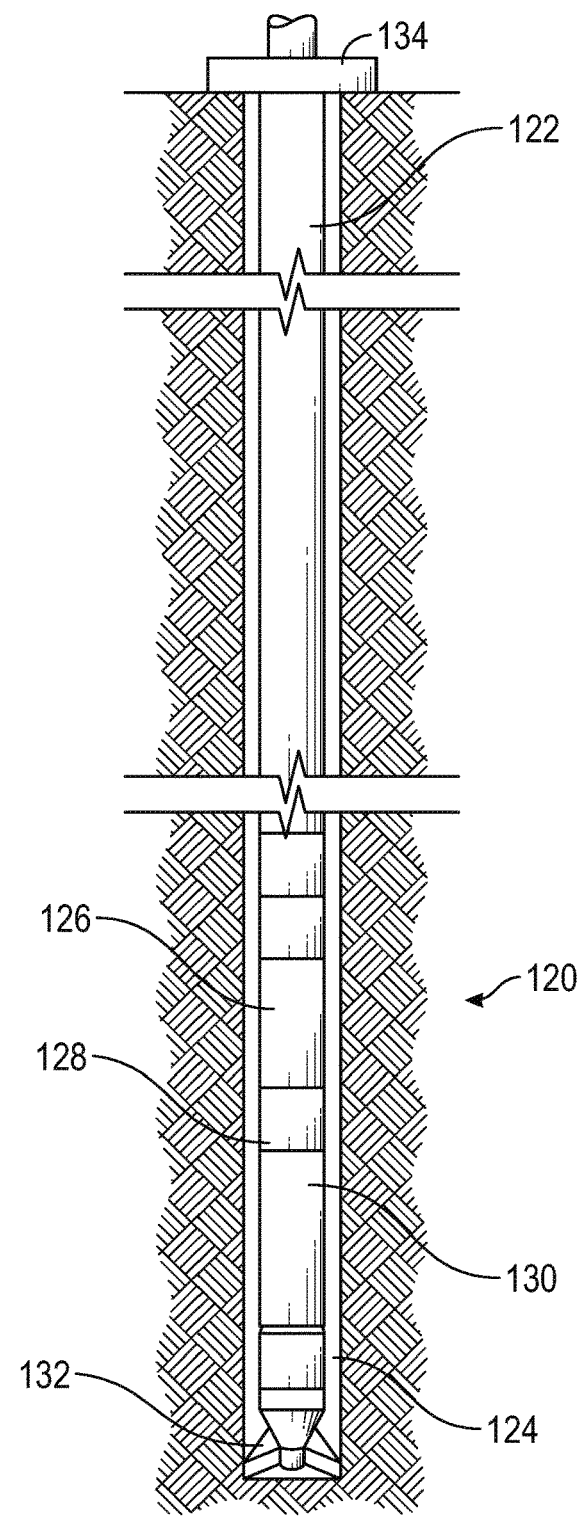
FIG. 8 is a schematic view of the drilling motor within a wellbore.

FIG. 8 is a schematic illustration of drilling motor 120 suspended from drill string 122 within wellbore 124. Drilling motor 120 may include power assembly 126, transmission assembly 128 including CV joint 40, and bearing assembly 130. Drill bit 132 may be attached to the lower end of drilling motor 120. Drilling mud may be pumped from well surface 134, through drill string 122, and to drilling motor 120. The drilling mud may rotate a rotor within power assembly 126. CV joint 40 may transmit torque and speed from the rotor to a drive shaft to which drill bit 132 is attached. Specifically, the rotor may cause rotor adapter 48 to rotate. Torque and speed may be transferred from rotor adapter 48 to first insert 50 through the engagement of inner profile 74 of rotor adapter 48 and outer profile 72 of first insert 50. Torque and speed may be transferred from first insert 50 to center shaft 42 through the engagement of top shear members 64 with recesses 68 on first insert 50 and with pockets 66 on outer surface of top shaft section 44. Torque and speed may be transferred from center shaft 42 to second insert 82 through the engagement of bottom shear members 96 with recesses 100 on second insert 82 and with pockets 98 on outer surface of bottom shaft section 46. Torque and speed may be transferred from second insert 82 to drive shaft adapter 80 through the engagement of outer profile 104 of second insert 82 with inner profile 106 of drive shaft adapter 80. Drive shaft adapter 80 may then rotate the drive shaft, which in turn may rotate drill bit 132.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

The invention claimed is:
1. A CV joint for a downhole drilling motor, comprising:
 a center shaft including a top shaft section and a bottom shaft section;
 a first insert including a cavity housing the top shaft section;

a second insert including a cavity housing the bottom shaft section;
a rotor adapter including a cavity housing the first insert; and
a drive shaft adapter including a cavity housing the second insert;
wherein the first insert includes an outer profile engaging an inner profile of the cavity of the rotor adapter for transmitting torque and speed from the rotor adapter to the first insert, wherein the outer profile of the first insert is reciprocally shaped relative to the inner profile of the cavity of the rotor adapter.

2. The CV joint of claim 1, wherein the first and second inserts each comprises a wear resistant material.

3. The CV joint of claim 2, wherein the wear resistant material is a ceramic material, tungsten carbide, chromium carbide, titanium carbide, or tool steel.

4. The CV joint of claim 1, wherein the first and second inserts each comprise a wear resistant surface.

5. The CV joint of claim 1, wherein a material of the first and second inserts has a hardness value that is greater than a hardness value of a material of the rotor adapter and the drive shaft adapter.

6. The CV joint of claim 5, wherein the material of the first and second inserts has a Brinell hardness value of 500 BHN or greater.

7. The CV joint of claim 1, wherein the second insert includes an outer profile engaging an inner profile of the cavity of the drive shaft adapter for transmitting torque and speed from the second insert to the drive shaft adapter, wherein the outer profile of the second insert is reciprocally shaped relative to the inner profile of the cavity of the drive shaft adapter.

8. The CV joint of claim 7, wherein the outer profiles of the first and second inserts are hexagonally-shaped projections, and wherein the inner profiles of the cavities of the rotor adapter and the drive shaft adapter are hexagonally-shaped recesses.

9. The CV joint of claim 1, further comprising a top thrust member disposed within a central cavity of the top shaft section and a bottom thrust member disposed within a central cavity of the bottom shaft section.

10. The CV joint of claim 9, wherein the top thrust member and the bottom thrust member each comprises a ball shape.

11. The CV joint of claim 9, further comprising a top thrust pin partially disposed within the central cavity of the top shaft section and contacting the cavity of the first insert, and a bottom thrust pin partially disposed within the central cavity of the bottom shaft section and contacting the cavity of the second insert.

12. The CV joint of claim 1, further comprising a series of top shear members and a series of bottom shear members, wherein the top shear members are partially housed within a series of pockets on the top shaft section and partially housed within a series of recesses on an inner surface of the cavity of the first insert, wherein the bottom shear members are partially housed within a series of pockets on the bottom shaft section and partially housed within a series of recesses on an inner surface of the cavity of the second insert.

13. The CV joint of claim 12, wherein the top and bottom shear members each comprises a ball shape.

14. A CV joint for a downhole drilling motor, comprising:
a center shaft including a top shaft section and a bottom shaft section, wherein an outer surface of the top shaft section includes a series of top shaft pockets and an outer surface of the bottom shaft section includes a series of bottom shaft pockets;
a first insert including a cavity and a series of recesses in the surface of the cavity, wherein the top shaft section is at least partially housed within the cavity of the first insert;
a second insert including a cavity and a series of recesses in the surface of the cavity, wherein the bottom shaft section is at least partially disposed within the cavity of the second insert;
a series of top shear members and a series of bottom shear members, wherein the top shear members are partially housed within the top shaft pockets and partially housed within the recesses of the first insert for transmitting torque and speed from the first insert to the center shaft, and wherein the bottom shear members are partially housed within the bottom shaft pockets and partially housed within the recesses of the second insert for transmitting torque and speed from the center shaft to the second insert;
a rotor adapter including a cavity housing the first insert; and
a drive shaft adapter including a cavity housing the second insert;
wherein the first insert includes an outer profile engaging an inner profile of the cavity of the rotor adapter for transmitting torque and speed from the rotor adapter to the first insert, wherein the outer profile of the first insert is reciprocally shaped relative to the inner profile of the cavity of the rotor adapter.

15. The CV joint of claim 14, wherein the top and bottom shear members each comprises a ball shape.

16. The CV joint of claim 14, wherein the first and second inserts each comprises a ceramic material, tungsten carbide, chromium carbide, titanium carbide, or tool steel.

17. The CV joint of claim 14, wherein the first and second inserts each comprise an abrasive wear resistant surface.

18. The CV joint of claim 14, wherein the material of the first and second inserts has a Brinell hardness value of 500 BHN or greater.

19. The CV joint of claim 14, wherein the second insert includes an outer profile engaging an inner profile of the cavity of the drive shaft adapter for transmitting torque and speed from the second insert to the drive shaft adapter for transmitting torque and speed from the second insert to the drive shaft adapter, wherein the outer profile of the second insert is reciprocally shaped relative to the inner profile of the cavity of the drive shaft adapter.

20. The CV joint of claim 19, wherein the outer profiles of the first and second inserts are hexagonally-shaped projections, and wherein the inner profiles of the cavities of the rotor adapter and the drive shaft adapter are hexagonally-shaped recesses.

21. The CV joint of claim 14, further comprising a top thrust member disposed within a central cavity of the top shaft section and a bottom thrust member disposed within a central cavity of the bottom shaft section.

22. The CV joint of claim 21, wherein the top thrust member and the bottom thrust member each comprises a ball shape.

23. A method of transmitting torque and speed in a downhole drilling motor, comprising the steps of:
(a) providing a CV joint comprising: a center shaft including a top shaft section and a bottom shaft section, wherein an outer surface of the top shaft section includes a series of top shaft pockets and an outer surface of the bottom shaft section includes a series of bottom shaft pockets; a first insert including a cavity and a series of recesses in the surface of the cavity, wherein the top shaft section is at least partially housed within the cavity of the first insert; a second insert including a cavity and a series of recesses in the surface of the cavity, wherein the bottom shaft section is at least partially disposed within the cavity of the second insert; a series of top shear members and a series of bottom shear members, wherein the top shear members are partially housed within the top shaft pockets and partially housed within the recesses of the first insert, and wherein the bottom shear members are partially housed within the bottom shaft pockets and partially housed within the recesses of the second insert; a rotor adapter including a cavity housing the first insert; and a drive shaft adapter including a cavity housing the second insert; wherein the CV joint further comprises an outer profile of the first insert engaging a reciprocally-shaped inner profile of the cavity of the rotor adapter and an outer profile of the second insert engaging a reciprocally-shaped inner profile of the cavity of the drive shaft adapter;

(b) rotating the rotor adapter;

(c) transmitting torque and speed from the rotor adapter to the first insert through the engagement of the inner profile of the cavity of the rotor adapter with the outer profile of the first insert;

(d) allowing the top shear members to freely move and rotate within the top shaft pockets and the recesses of the first insert, and transmitting torque and speed from the first insert to the center shaft;

(e) allowing the bottom shear members to freely move and rotate within the bottom shaft pockets and the recesses of the second insert, and transmitting torque and speed from the center shaft to the second insert; and (f) transmitting torque and speed from the second insert to the drive shaft adapter through the engagement of the outer profile of the second insert with the inner profile of the cavity of the drive shaft adapter.

\* \* \* \* \*